United States Patent [19]

Deis

[11] 4,037,312

[45] July 26, 1977

[54] METHOD OF FABRICATING A MECHANICALLY STABLE ELECTRICAL WINDING HAVING COOLING OPENINGS THEREIN

[75] Inventor: Daniel W. Deis, Pittsburgh, Pa.

[73] Assignee: Westinghouse Electric Corporation, Pittsburgh, Pa.

[21] Appl. No.: 532,288

[22] Filed: Dec. 12, 1974

Related U.S. Application Data

[63] Continuation of Ser. No. 307,314, Nov. 16, 1972, now Defensive Publication No. T915,004.

[51] Int. Cl.² ............................................. H02K 15/09
[52] U.S. Cl. ................................... 29/598; 29/421 R; 29/599; 29/605; 310/42; 310/43; 310/59; 310/214; 310/215; 336/205; 336/DIG. 1
[58] Field of Search ................. 29/596, 598, 605, 606, 29/421, 599; 310/42, 43, 45, 214, 215, 59; 336/205, DIG. 1

[56] References Cited

U.S. PATENT DOCUMENTS

| 3,044,150 | 7/1962 | Higley | 29/596 |
| 3,239,598 | 3/1966 | Olson et al. | 29/605 |
| 3,412,354 | 11/1968 | Sattler | 29/605 |
| 3,618,205 | 11/1971 | Barber et al. | 29/599 |
| 3,624,432 | 11/1971 | Merz | 310/214 |
| 3,676,814 | 7/1972 | Trunzo et al. | 29/605 |
| 3,775,842 | 12/1973 | Sheldon et al. | 29/606 |

FOREIGN PATENT DOCUMENTS

| 2,060,361 | 6/1972 | Germany | 310/214 |

Primary Examiner—Carl E. Hall
Attorney, Agent, or Firm—G. H. Telfer

[57] ABSTRACT

Insulated wire coated with a bonding material is formed into cables and wound in an appropriate chamber. A pressurizing material is utilized to compress the wires in the chamber. The pressurizing material is then hardened to maintain the wires in the compressed state. Heat is then applied to cause the bonding material to bond the wires together and rigidly maintain them in the positions they occupy when compressed.

8 Claims, 3 Drawing Figures

METHOD OF FABRICATING A MECHANICALLY STABLE ELECTRICAL WINDING HAVING COOLING OPENINGS THEREIN

This is a continuation of application Ser. No. 307,314, filed Nov. 16, 1972, now Defensive Publication No. 915,004.

BACKGROUND OF THE INVENTION

1. Field of the invention

This invention relates primarily to the fabrication and structure of an electrical winding in which individual wires must be maintained motionless, and more specifically, this invention relates to a method of fabricating and the structure of a superconductive electrical winding formed in the slots of a dynamoelectric machine rotor.

2. Description of the Prior Art

In rotating machine applications, a superconductive wire utilized for the windings is normally in the form of a multiplicity of relatively small filaments of superconductive material. These filaments are then encased in a copper matrix to form a superconductive wire. At cryogenic temperatures (approaching absolute zero), the superconductive material is resistanceless and hence, at these temperatures, the copper appears as an insulator.

While the above-identified wires have extremely high current carrying capacity at cryogenic temperatures, it is still necessary to obtain current capacities many times larger than those found in a conventional wire of this nature for many types of electromagnetic devices. Such large current carrying capacities are necessary because of the design criteria of machines with extremely large power capabilities.

In order to achieve the requisite high currents, it is necessary to either make the wire larger or to fabricate a cable from many wires. Making the wire larger results in many detrimental effects with respect to the properties of the superconductive wires. Therefore, cabling a number of wires provides more beneficial results while providing the higher current capacities that are required.

While cabling has many advantages in the production of greater current capacities, such as permitting the transposition of wires to achieve the resultant benefits, there are still significant problems that have been left unsolved by prior art approaches. Prior art cables, both braided and transposed, have usually been made either from fully insulated or uninsulated wires potted in solder (usually a silver-tin eutectic).

When a cable is made up from fully insulated wires, it has the benefits of low losses in an applied AC field, such as that due to negative sequence currents. In addition, the porosity of this type of structure permits the passing of a coolant (a cryogenic refrigerant in the case of superconductive windings) therethrough. However, this structure has the disadvantage that the wires may move relative to each other, resulting in mechanical instability. Of course, in a superconductive coil the movement of any wire relative to the magnetic field can result in "quenching" or loss of the superconductive effect in the entire coil.

In cables made from wires potted in solder, mechanical stability of the coil is achieved. However, large eddy currents flow in the presence of an AC field, with the resultant high losses. Attempts have been made to pot the wires in a material that would provide some insulation, such as an epoxy bonding material, but when used in these ways it was found that the epoxy did not provide sufficient mechanical strength as a potting compound. In addition, the epoxy was found to be inadequate as an insulating material. Thus, the present assumption of those skilled in this art is that it is necessary to live with either the mechanical instability of cables made from insulated wires or the high losses resulting from uninsulated wires potted in solder.

In addition to its use as a potting agent, bonding material has been coated on insulated wire. Again, however, the mechanical strength of such bonding material standing above is not sufficiently great to preclude relative movement between the wires of a winding.

Large motor and generator rotor windings with large bars for conductors have been compressed by the use of a pressurizing medium located in the rotor slots. This procedure is utilized to compact the bars against the slot wedges and to preclude vertical movement in the slots. However, this technique is limited to structures involving a relativey few large bars in the slots where the prime desire is to eliminate vertical motion. To use such an approach with structures in which a relatively large number of wires are located in a slot would result in damage to the wires, upon application of the large pressures needed to compress the wires sufficiently to preclude both vertical and horizontal movement. In addition, compacting the wires to this degree would completely eliminate the interstices useful for cooling purposes.

SUMMARY OF THE INVENTION

The present invention achieves the benefits of both prior art approaches (i.e., the mechanical stability of potting, together with the lower losses and cooling of braided or transposed insulated wires), with a corresponding diminution of the disadvantages thereof. Although prior art attempts to utilize a bonding material ended in rejection of such an approach due to the lack of mechanical strength and insufficient insulating capability when used as a potting material, the invention disclosed herein makes use of the desirable characteristics of such a bonding material, while providing additional mechanical strength and eliminating the necessity of the bonding material having to exhibit insulating capabilities. These benefits are achieved by utilizing the bonding material with insulated wire and compressing and holding the winding structure sufficiently to eliminate major mechanical movement without injuring the wires or compacting the wires into a solid mass. The bonding material can then hold the individual wires rigidly in position, while the insulation on the wires precludes the necessity of the bonding material having to provide insulation.

Briefly, the foregoing procedure will be described with respect to the production of a superconductive rotor coil, although it should be recognized that this method has applicability outside this particular environment. The wires to be utilized in this particular example will have multiple filaments of a superconductive material formed into a strand. The strand of superconductive filaments is then embedded in a casing of a normally conductive material, such as copper. The resulting wire is then surrounded by an appropriate insulating material, which could be, for example, a layer of phenolic modified polyvinyl formal. The insulation is then covered or coated with a bonding material. The bonding material could be any appropriate material such as a material that bonds to itself when pressurized, but for this particular example an epoxy that bonds itself when heated is utilized. A number of wires are then formed into a cable, which may be either braided or transposed.

A desired number of winds of the cable are then placed in an appropriate chamber in the structure in which the winding is to be formed. In this particular application, the chamber will be a slot in the rotor of a dynomelectric machine. In the case of such a slot, a wedge is driven into the slot to compact the winds and maintain them in the slot Provision is made for inserting a pressurizing material into the chamber after the winds are placed therein. In the case of a slot, this could be achieved by placing a collapsible tube at the bottom of the slot and then inserting the pressurizing material into the tube to expand it and compress the winds. The pressurizing material compresses the winds sufficiently to form a compact unit and to cause the bonding material to merge, but without forcing the bonding material to flow into the openings where adjacent wires do not abut. Thus, the porosity of the winding is maintained so that a coolant or refrigerant may be passed directly therethrough without separate cooling ducts.

The pressurizing material could be any material that has sufficient fluidity to be forced into the chamber. A particular example of such a fluid material would be liquid epoxy. After the winds have been compressed to the desired degree, the pressurizing material is hardened to maintain the winds in the compressed state. The whole structure is then heated to cause the bonding material to bond the wires together and rigidly maintain them in the positions that they occupy in the compressed winds.

As a result of the foregoing construction, a winding is provided which has excellent mechanical stability and yet reduces losses from surrounding AC fields to a minimum. At the same time, passages for a coolant or refrigerant are provided in the winding so that additional cooling ducts are not required.

The foregoing and other objects, advantages and features of this invention will hereinafter appear, and for purposes of illustration, but not of limitation, an exemplary embodiment of the subject invention is shown in the appended drawing.

DESCRIPTION OF THE PREFERRED EMBODIMENT

Figure 1:
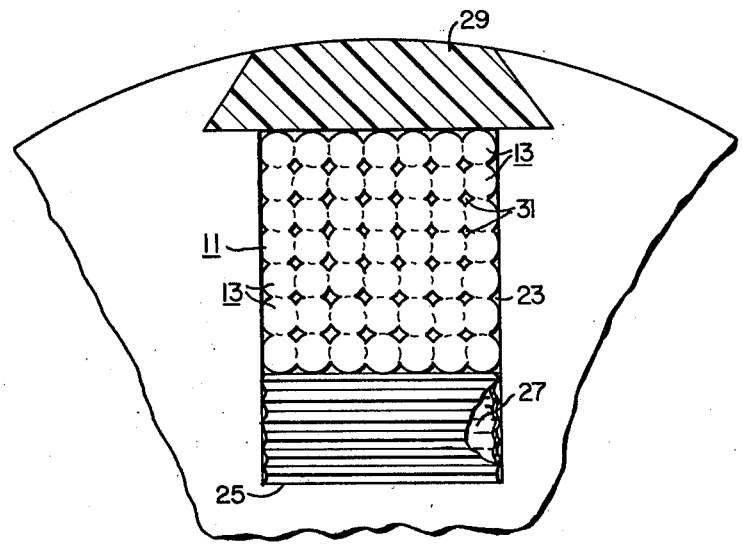
FIG. 1 illustrates a portion of a dynomelectric machine rotor having a winding formed in the slot thereof pursuant to the present invention.

A winding 11 constructed pursuant to the present invention is illustrated as a rotor coil in FIG. 1. The following description of the invention will be made with respect to a superconductive rotor coil. However, the present invention has applicability to the fabrication of other windings (e.g., stator coils, electromagnets, etc.) and wires utilized in the winding need not be superconductive, although the invention has particular applicability to the specific embodiment illustrated and discussed herein.

Figure 2:
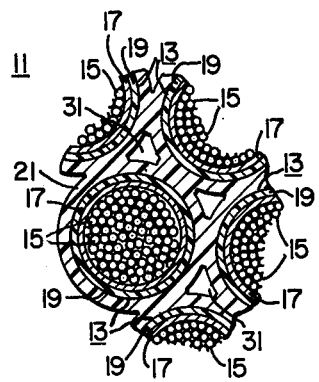
FIG. 2 is an enlarged view of a portion of the winding of the embodiment illustrated in FIG. 1.

The superconductive wires 13 utilized in this preferred embodiment are relatively conventional superconductive wires, which may be seen in greater detail in the enlarged view of FIG. 2. Wires 13 have a multiplicity of filaments 15 formed of a suitable superconductive material. An example of such a superconductive material is niobium-titanium. Filaments 15 are formed into a strand which is encased by a sheath 17 of normally conductive material, such as copper. At cryogenic temperatures when filaments 15 are resistanceless, sheath 17 appears as a non-conductor or insulator. Each of the sheaths 17 of normally conductive material is surrounded by a layer of insulation 19. Insulation 19 may be of any suitable insulating material, although the material found most suitable in this application is phenolic modified polyvinyl formal.

Each of the wires 13 is then covered or coated with a bonding material 21. Bonding material 21 is a material that will bond itself and form a rigid structure under certain conditions. For example, bonding material 21 could be a pressure sensitive material that would bond to itself when sufficient pressure is applied. In this particular embodiment, however, the bonding material that has been utilized is an epoxy resin that will bond to itself when heated to a determinable temperature. Therefore, when wires 13 are placed so that the coating of bonding material thereon abuts and temperature is applied, the bonding material will bind and mold the abutting wires in their relative positions. Also, the binding material must be a relatively viscous substance so that it does not flow into the interstices among the wires to too great an extend, when pressure is applied.

The wire illustrated in FIGS. 1 and 2 are shown as having a circular cross-section. Of course, this invention is also applicable to other wire shapes, although to retain the porosity of the winding the wire should be of a shape such that interstices are formed when adjacent wires are abutted.

Wires 13 coated with bonding material 21 are then formed into cables. These cables may be formed either by braiding or transposition of wires 13. After the cable is formed, a number of winds thereof are placed in a rotor slot 23. Of course, the winding 11 could be formed equally well in any appropriate chamber.

Figure 1A:
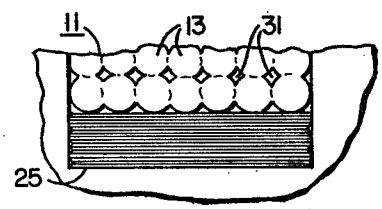
FIG. 1A is a partial view of the slot of FIG. 1 prior to expansion of the tube at the bottom of the slot.

At the bottom of slot 23 there is located a collapsible tube 25, shown in the collapsed state in FIG. 1A. In both FIGS. 1 and 1A, collapsible tube 25 is shown for purposes of illustration, as occupying a greater portion of slot 23 than it would normally occupy in practice.

Collapsible tube 25 is formed of any appropriate material that may be expanded by the insertion of a pressurizing material 27 therein. Pressurizing material 27 may be any material that is sufficiently fluid to be forced into tube 25 to cause expansion of tube 25 and a corresponding compression of the winds located in slot 23 above tube 25. The pressurizing material 27 and tube 25 must then be sufficiently rigid to maintain the winds in the compressed state. In this particular embodiment, a liquid epoxy is utilized as the pressurizing material 27. After the epoxy 27 has been inserted to compress the winds of winding 11 with sufficient pressure to cause bonding material 21 on abutting wires to merge (but without completely filling the interstices between abutting wires 13), it is hardened to retain the winds and the wires therein in these relative positions. The epoxy 27 may be of the thermosetting type that hardens when heated, or it may be subject to hardening in any desired fashion.

To maintain the winds in slot 23 upon insertion of the pressurizing material 27, a slot wedge 29 is utilized. This is a conventional type of slot wedge that is forced into the outer portion of the slot after the winds are positioned therein to form a force-fit in the outer portion of the slot. Actually, slot wedge 29 compresses the winds to some degree as it is inserted into the slot, prior to insertion of the pressurizing material 27.

After the pressurizing material 27 has caused the winds to be compressed to the desired extent, bonding material 21 on abutting wires has been merged and formed as indicated in FIG. 2. Of course, as heat is required to make the material bond to itself, the bonding material on one wire has still not formed a permanent bond with the bonding material on an adjacent wire. However, heat is now applied to the structure so that such a bond will be formed. In this way, the wires 13 are rigidly maintained in the relative positions that result after compression of the winds by pressurizing material 27. It should be noted that interstices 31 are retained in the winding structure. An appropriate coolant, such as a cryogenic refrigerant (e.g., liquid helium), may be forced through the interstices to achieve desired cooling.

It should be understood that various modifications, changes and variations may be made in the arrangements, operations and details of construction of the elements disclosed herein without departing from the spirit and scope of the present invention.

I claim:

1. A method of fabricating a superconductive electrical winding in a structure having a chamber to receive the winding comprising:
    forming a plurality of superconductive filaments into a single strand;
    encasing the strand of superconductive filaments in a normally conductive material to form a wire;
    insulating the wire;
    covering the insulated wire with a thermally responsive bonding material;
    forming a plurality of the insulated wires covered with the thermally responsive bonding material into a composite cable;
    placing a desired number of winds of the cable in the chamber;
    compressing the winds in the chamber by means of a fluid pressurizing material, the pressure of said compressing being sufficient to cause the bonding material of adjacent wires in the winding to merge without filling in the interstices among the wires;
    hardening the pressurizing material to maintain the winds in the compressed state; and
    heating the structure to cause the bonding material to bond the wires together and secure them in the positions they occupy in the compressed winds.

2. A method as claimed in claim 1 wherein said insulating step comprises surrounding each of the individual wires with a layer of phenolic modified polyvinyl formal.

3. A method as claimed in claim 1 wherein said covering step comprises coating the insulated wire with an epoxy that is self-bonding when heated.

4. A method of fabricating a superconductive rotor winding in a rotor having slots to receive the winding comprising;
    locating a collapsible tube in the bottom of a slot;
    forming multi-filament insulated superconductive wires covered with a bonding material into a cable;
    placing a desired number of winds of the cable in the slot;
    forcing a wedge into the slot to compress the winds and hold them in the slot; and
    expanding the collapsible tube to compress the winds against the wedge and cause the bonding materials on abutting wires to merge without filling in the interstices among adjacent wires.

5. A method as claimed in claim 4 wherein the bonding material is thermally responsive and further comprising the step of heating the rotor to activate the bonding material to rigidly bond the wires together in the positions they occupy in the compressed winds.

6. A method as claimed in claim 4 wherein the expanding step is achieved by injecting a fluid epoxy into the collapsible tube.

7. A method as claimed in claim 6 and further comprising the step of hardening the fluid epoxy to retain the winds in the compressed state.

8. A method as claimed in claim 7 wherein the bonding material is thermally responsive and further comprising the step of heating the rotor to activate the bonding material to rigidly bond the wires together in the positions they occupy in the compressed winds.

* * * * *